United States Patent
Devendran et al.

(10) Patent No.: US 12,316,529 B2
(45) Date of Patent: *May 27, 2025

(54) SYSTEMS AND METHODS FOR DETERMINING PROBLEMATIC PATHS BETWEEN INTEREST POINTS IN A MULTI-CLOUD ENVIRONMENT

(71) Applicant: Cisco Technology, Inc., San Jose, CA (US)

(72) Inventors: Vijay Kumar Devendran, Fremont, CA (US); Kiran Kumar Meda, Milpitas, CA (US); Rajagopalan Janakiraman, Cupertino, CA (US); Shyam N. Kapadia, San Jose, CA (US); Javed Asghar, Dublin, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/589,837

(22) Filed: Feb. 28, 2024

(65) Prior Publication Data
US 2024/0205138 A1    Jun. 20, 2024

Related U.S. Application Data

(63) Continuation of application No. 17/390,511, filed on Jul. 30, 2021, now Pat. No. 11,929,917.

(51) Int. Cl.
*H04L 43/0829* (2022.01)
*H04L 43/0852* (2022.01)
(Continued)

(52) U.S. Cl.
CPC .......... *H04L 45/22* (2013.01); *H04L 43/0829* (2013.01); *H04L 43/0858* (2013.01); *H04L 43/087* (2013.01); *H04L 43/10* (2013.01)

(58) Field of Classification Search
CPC . H04L 45/22; H04L 43/0829; H04L 43/0858; H04L 43/087; H04L 43/10;
(Continued)

(56) References Cited

U.S. PATENT DOCUMENTS 11,294,723 B1 *   4/2022   Mathew ............... G06F 9/5016
11,929,917 B2 *   3/2024   Devendran ......... H04L 41/0677
(Continued)

FOREIGN PATENT DOCUMENTS

EP        3346661 A1     7/2018

OTHER PUBLICATIONS

Brockners F., "Next-Gen Network Telemetry is Within Your Packets: In-band OAM," Jun. 28, 2017, 51 Pages.
(Continued)

*Primary Examiner* — Kamal M Hossain
(74) *Attorney, Agent, or Firm* — Baker Botts L.L.P.

(57) ABSTRACT

In one embodiment, a method includes identifying a problematic event between a first interest point and a second interest point of a network and activating, in response to identifying the problematic event between the first interest point and the second interest point, a first endpoint associated with the first interest point and a second endpoint associated with the second interest point. The method also includes receiving, from the first endpoint and the second endpoint, telemetry data associated with a problematic path between the first interest point and the second interest point. The method further includes determining the problematic path between the first interest point and the second interest point using the telemetry data received from the first endpoint and the second endpoint.

20 Claims, 7 Drawing Sheets

(51) Int. Cl.
*H04L 43/087* (2022.01)
*H04L 43/091* (2022.01)
*H04L 43/10* (2022.01)
*H04L 45/00* (2022.01)
*H04L 41/0677* (2022.01)

(58) Field of Classification Search
CPC ... H04L 43/0852; H04L 43/091; H04L 43/12; H04L 41/0677
See application file for complete search history.

(56) References Cited

U.S. PATENT DOCUMENTS

| | | | |
|---|---|---|---|
| 2011/0141899 A1* | 6/2011 | Yae | H04L 43/106 370/236.2 |
| 2011/0235525 A1 | 9/2011 | Nishi | |
| 2015/0066759 A1 | 3/2015 | Madani et al. | |
| 2015/0317197 A1 | 11/2015 | Blair | |
| 2015/0319057 A1* | 11/2015 | Jocha | H04L 43/04 370/241.1 |
| 2016/0112328 A1 | 4/2016 | Anand | |
| 2017/0012843 A1 | 1/2017 | Zaidi, III et al. | |
| 2017/0097841 A1* | 4/2017 | Chang | H04L 43/20 |
| 2017/0250892 A1* | 8/2017 | Cooper | G06F 21/552 |
| 2018/0026884 A1 | 1/2018 | Nainar et al. | |
| 2020/0204465 A1* | 6/2020 | Baker | G06F 21/554 |
| 2020/0280587 A1 | 9/2020 | Janakiraman et al. | |
| 2020/0336360 A1* | 10/2020 | Ward | H04L 41/0677 |
| 2022/0086035 A1* | 3/2022 | Devaraj | H04L 43/0882 |
| 2022/0141715 A1* | 5/2022 | Mayor | H04W 24/02 370/254 |

OTHER PUBLICATIONS

Butler B., "Who's the Best Cloud Latency?," Jul. 13, 2016, pp. 1-6, Retrieved from URL: https://www.networkworld.com/article/3095022/who-s-got-the-best- cloud-latency.html.

Cisco, "Cisco Nexus 9000 Series NX-OS VXLAN Configuration Guide, Release 9.3(x)," Chapter: Configuring VXLAN OAM, Jul. 26, 2021, 13 Pages.

International Search Report and Written Opinion for International Application No. PCT/US2022/073711, mailed Oct. 21, 2022, 11 Pages.

* cited by examiner

SYSTEMS AND METHODS FOR DETERMINING PROBLEMATIC PATHS BETWEEN INTEREST POINTS IN A MULTI-CLOUD ENVIRONMENT

PRIORITY

This nonprovisional application is a continuation, under 35 U.S.C. § 120, of U.S. patent application Ser. No. 17/390,511 filed on Jul. 30, 2021, and entitled "SYSTEMS AND METHODS FOR DETERMINING PROBLEMATIC PATHS BETWEEN INTEREST POINTS IN A MULTI-CLOUD ENVIRONMENT," all of which is hereby incorporated by reference in its entirety.

TECHNICAL FIELD

The present disclosure relates generally to communication networks, and more specifically to systems and methods for determining problematic paths between interest points in a multi-cloud environment.

BACKGROUND

Public clouds are computing services offered by third-party providers over the Internet. Public clouds provide platforms for deploying applications easily and instantly, which may reduce or eliminate the need to maintain on-premise infrastructure and Information Technology (IT) staff. Traffic in public clouds has increased exponentially as applications are built and hosted in public clouds directly. In certain instances, on-premise infrastructure is decommissioned as on-premise applications are migrated to public clouds.

DESCRIPTION OF EXAMPLE EMBODIMENTS

Overview

Figure 1:
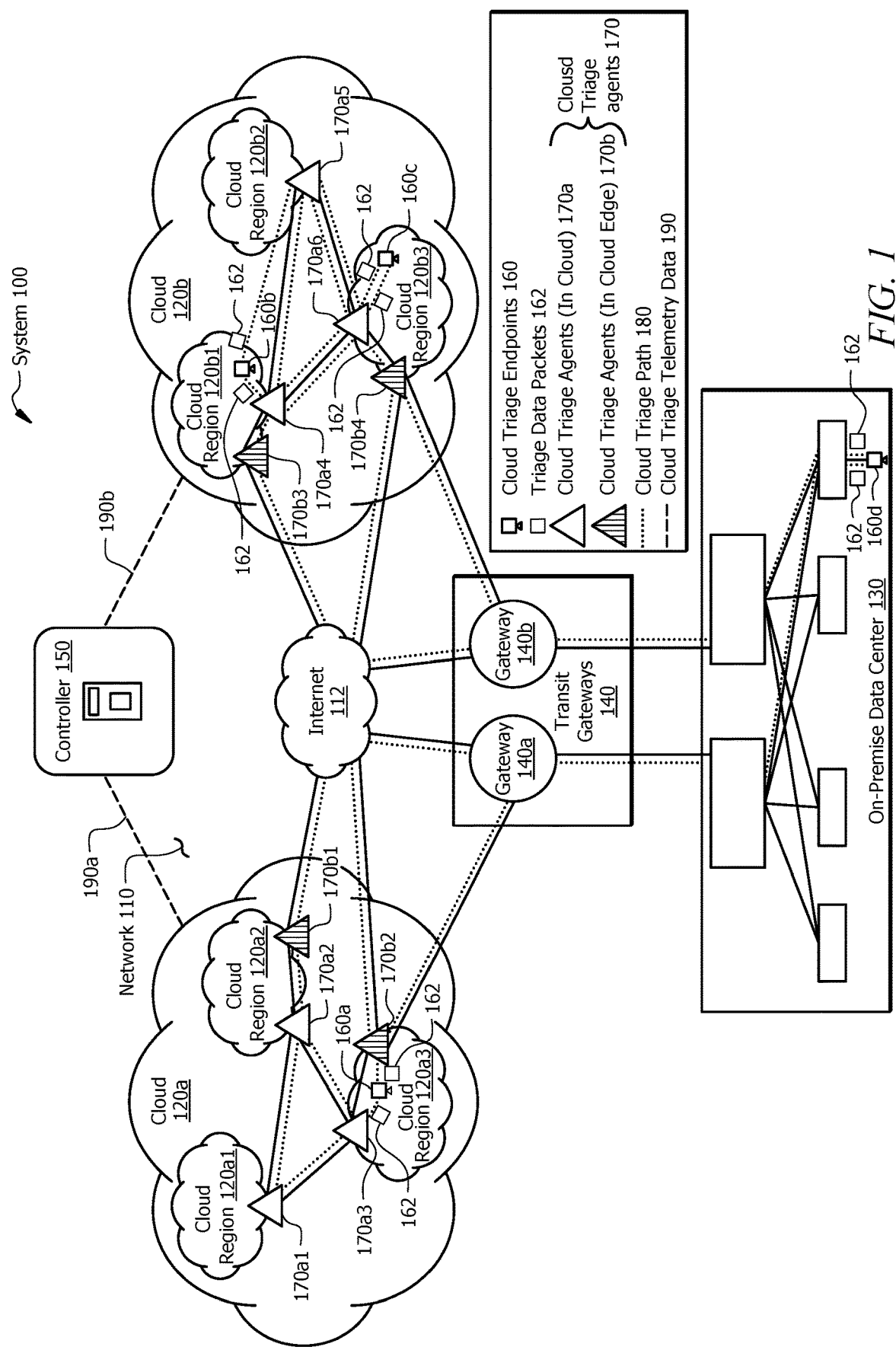
FIG. 1 illustrates an example system for determining problematic paths between interest points in a multi-cloud environment.

According to an embodiment, a controller includes one or more processors and one or more computer-readable non-transitory storage media coupled to the one or more processors and including instructions that, when executed by the one or more processors, cause the controller to perform operations. The operations include identifying a problematic event between a first interest point and a second interest point of a network and activating, in response to identifying the problematic event between the first interest point and the second interest point, a first endpoint associated with the first interest point and a second endpoint associated with the second interest point. The operations also include receiving, from the first endpoint and the second endpoint, telemetry data associated with a problematic path between the first interest point and the second interest point. The operations further include determining the problematic path between the first interest point and the second interest point using the telemetry data received from the first endpoint and the second endpoint.

In certain embodiments, the operations include activating one or more cloud agents within the network. The operations may include receiving, from the one or more cloud agents, additional telemetry data associated with the path between the first interest point and the second interest point. The operations may include computing the path between the first interest point and the second interest point using the additional telemetry data received from the one or more cloud agents. In some embodiments, the operations include instructing one or more transit routers within the network to redirect an identified traffic flow to a cloud agent.

In certain embodiments, activating the first endpoint and the second endpoint initiates a generation of Operations, Administration, and Maintenance (OAM) data packets by the first endpoint and the second endpoint. The telemetry may be collected by the OAM data packets. In certain embodiments, the telemetry data includes one or more of the following: an identification of a cloud region; an identification of availability zones; a location of a cloud edge; an identification of a path type; latency; and jitter.

In some embodiments, each of the first interest point and the second interest point are associated with one of the following: a public cloud; a private cloud; or an on-premise data center. In certain embodiments, the problematic event is associated with at least one of the following network characteristics: latency; jitter; or packet drop.

According to another embodiment, a method includes identifying a problematic event between a first interest point and a second interest point of a network and activating, in response to identifying the problematic event between the first interest point and the second interest point, a first endpoint associated with the first interest point and a second endpoint associated with the second interest point. The method also includes receiving, from the first endpoint and the second endpoint, telemetry data associated with a problematic path between the first interest point and the second interest point. The method further includes determining the problematic path between the first interest point and the second interest point using the telemetry data received from the first endpoint and the second endpoint.

According to yet another embodiment, one or more computer-readable non-transitory storage media embody instructions that, when executed by a processor, cause the processor to perform operations. The operations include identifying a problematic event between a first interest point and a second interest point of a network and activating, in response to identifying the problematic event between the first interest point and the second interest point, a first endpoint associated with the first interest point and a second endpoint associated with the second interest point. The operations also include receiving, from the first endpoint and the second endpoint, telemetry data associated with a problematic path between the first interest point and the second interest point. The operations further include determining the problematic path between the first interest point and the second interest point using the telemetry data received from the first endpoint and the second endpoint.

Technical advantages of certain embodiments of this disclosure may include one or more of the following. This disclosure provides a cloud agnostic solution that can be used within regions of a single cloud environment, a multi-cloud environment, and/or hybrid-cloud environment for cloud native visibility and fault detection/correction. In certain embodiments, cloud triage is triggered automatically between two workload interest points when there is an anomaly detected. The disclosure includes methods for detecting configuration mis-programming errors and reporting the location and error code. In certain embodiments of the disclosure, the disclosed systems and methods measure latency segments between end-to-end paths. In some embodiments, the disclosed methods and systems detect and/or report packet drops in every segment along an end-to-end path. Since the entire cloud triage schema may be integrated with an Software-defined wide area network (SD-WAN) controller in certain embodiments, the controller can use this information to zoom into where the fault occurred and report the root cause of fault in a single pane of glass. The operations of the cloud administrators are thus simplified since the SD-WAN controller can recommend corrective steps to repair the fault and/or autocorrect. In the area of multi-cloud networking, this disclosure may provide a competitive advantage in normalizing triaging across various cloud vendors.

Other technical advantages will be readily apparent to one skilled in the art from the following figures, descriptions, and claims. Moreover, while specific advantages have been enumerated above, various embodiments may include all, some, or none of the enumerated advantages.

EXAMPLE EMBODIMENTS

This disclosure describes systems and methods for determining problematic paths between interest points in a multi-cloud environment. SD-WAN solutions are currently capable of directing traffic based on service-level agreement (SLA) definitions. Application traffic patterns and graphs may be associated with one or more clouds. Application traffic may include cloud traffic (e.g., Amazon Web Services (AWS) traffic), multi-cloud traffic (e.g. AWS and Microsoft Azure ("Azure") traffic), hybrid cloud traffic (e.g., AWS and on-premise traffic, Microsoft Azure and public traffic, etc.), or a combination thereof. Debugging and trouble-shooting breakages or problems in these traffic patterns may prove challenging, particularly in multi-cloud and hybrid-cloud cases since each public cloud's instrumentation is proprietary and may not provide cross-domain fault detection, visibility, telemetry, and/or isolation of faults for root cause analysis and fault recovery. In certain embodiments, application traffic packet flow can traverse: a cloud platform native network (e.g., an AWS backbone connecting multiple regions), a public Internet for multi-cloud or cloud to-on-premise hybrid cloud flows, cloud provider leased line networks for cloud-to-on-premise (e.g., Direct connect in AWS, ExpressRoute in Azure, etc.), cloud-to-cloud connectivity through a co-location provider (e.g., Megaport), and the like.

Because application traffic flow from point A to point B may have "n" number of paths and the packets may take any one of the paths based on the forwarding decision taken by the packet switch/route components in the cloud, visibility and fault isolation becomes difficult. Due to these complex heterogeneous networks, no known solution exists today to triage these public cloud networking problems. For example, current solutions cannot exactly identify a fault causing increased latency in the packet flows and/or workloads to perform poorly. In the public cloud, the maximum visibility available today is that a given cloud region/availability zone is performing below optimum. This disclosure provides systems and methods for determining the cause of the issue or, if needed, to find alternate paths to switch the traffic to a "best" path to increase the workload performance and improve customer experience.

FIG. 1 illustrates an example system 100 for determining problematic paths between interest points in a multi-cloud environment. System 100 or portions thereof may be associated with an entity, which may include any entity, such as a business, company, or enterprise, that determining problematic paths between interest points in a multi-cloud environment. In certain embodiments, the entity may be a service provider that provides networking services (e.g., Internet, Ethernet, optical, wireless, mobility, cloud computing, etc.). The components of system 100 may include any suitable combination of hardware, firmware, and software. For example, the components of system 100 may use one or more elements of the computer system of FIG. 7. In the illustrated embodiment of FIG. 1, system 100 includes a network 110, clouds 120, an on-premise data center 130, transit gateways 140, a controller 150, cloud triage endpoints 160, tirage data packets 162, and cloud triage agents 170.

Network 110 of system 100 is any type of network that facilitates communication between components of system 100. Network 110 may connect one or more components of system 100. One or more portions of network 110 may include an ad-hoc network, an intranet, an extranet, a virtual private network (VPN), an Ethernet VPN (EVPN), a local area network (LAN), a wireless LAN (WLAN), a virtual LAN (VLAN), a wide area network (WAN), a wireless WAN (WWAN), an SD-WAN, a metropolitan area network (MAN), a portion of Internet 112, a portion of the Public Switched Telephone Network (PSTN), a cellular telephone network, a Digital Subscriber Line (DSL), an Multiprotocol Label Switching (MPLS) network, a 3G/4G/5G network, a Long Term Evolution (LTE) network, a cloud network, a combination of two or more of these, or other suitable types of networks. Network 110 may include one or more different types of networks. Network 110 may be any communications network, such as a private network, a public network, a connection through Internet 112, a mobile network, a WI-FI network, etc. One or more components of system 100 may communicate over network 110. Network 110 may include a core network (e.g., Internet 112), an access network of a service provider, an Internet service provider (ISP) network, and the like.

Network 110 may include one or more nodes. Nodes are connection points within network 110 that receive, create, store and/or send data along a path. Nodes may include one or more redistribution points that recognize, process, and forward data to other nodes of network 110. Nodes may include virtual and/or physical nodes. For example, nodes may include one or more virtual machines, bare metal servers, and the like. As another example, nodes may include data communications equipment such as routers (e.g., edge routers, headend routers, etc.), servers, printers, workstations, switches, bridges, modems, hubs, and the like. In the illustrated embodiment of FIG. 1, network 110 includes clouds 120, on-premise data center 130, transit gateways 140, and controller 150.

Clouds 120 of system 100 are platforms that offer services via one or more remote cloud computing network elements (e.g., routers, servers, gateways, etc.). Cloud computing is an on-demand availability of computer system resources, such as data storage and computing power, without direct active management by the user. Clouds 120 may be associated with one or more of the following cloud service providers: AWS, Microsoft Azure, Google Cloud, Alibaba Cloud, IBM Cloud, Oracle, Salesforce, SAP, Rackspace Cloud, VMWare, etc. For example, cloud 120*a* may be a Microsoft Azure cloud computing service, and cloud 120*b* may be an AWS cloud computing service. In certain embodiments, clouds 120 are offered in different service models based on business requirements. Cloud service models may include Software as a Service (Saas), Platform as a Service (PaaS), Infrastructure as a Service (IaaS), Function as a Service (FaaS), Internet 112, one or more private cloud services, and the like.

In the illustrated embodiment of FIG. 1, clouds 120 include cloud regions. Each cloud region is a geographic location where the cloud resources (e.g., data centers) are located. In certain embodiments, each cloud region may include a set of data centers deployed within a latency-defined perimeter and connected through a dedicated regional low-latency network. In the illustrated embodiment of FIG. 1, cloud 120*a* includes cloud region 120*a***l*, cloud region 120*a*2, and cloud region 120*a*3, and cloud 120*b* includes cloud region 120*b*1, cloud region 120*b*2, and cloud region 120*b*3. Cloud regions may span multiple cities, states, and/or countries. For example, cloud region 120*a***l* may be located in US East (Ohio), cloud region 120*a*2 may be located in US East (Virginia), and cloud region 120*a*3 may be located in US West (Oregon). As another example, cloud region 120*b*1 may be located in Asia Pacific (Hong Kong), cloud region 120*b*2 may be located in Europe (Paris), and cloud region 120*b*3 may be located in China (Beijing).

On-premise data center 130 of system 100 is a collection of network components that are privately owned and controlled. In certain embodiments, an enterprise may run software and store data in its own on-premise data center 130. In some embodiments, one or more users may lease data center resources stored in on-premise data center 130 from a third-party service provider. Transit gateways 140 of system 100 are transit hubs used to interconnect cloud and on-premises networks. In the illustrated embodiment of FIG. 1, transit gateways 140 of system 100 connect cloud 120*a*, cloud 120*b*, and on-premise data center 130 through a central hub.

Controller 150 of system 100 is a component that manages and directs the flow of traffic within network 110. In certain embodiments, controller 150 is an SD-WAN controller. Controller 150 may include one or more smart controllers, management controllers, orchestrators, and the like. Controller 150 may be deployed by any entity such as a business, a company, an enterprise, and the like. In certain embodiments, controller 150 is associated with an entity such as a service provider (e.g., an ISP or a cloud service provider). In some embodiments, controller 150 receives data (e.g., telemetry data) from one or more components of system 100. Controller 150 may record the received telemetry data and/or store the telemetry data in a database. Controller 150 may include one or more components of the computer system of FIG. 7.

Cloud triage endpoints 160 of system 100 are nodes within network 110 that may be activated on demand by controller 150. Cloud triage endpoints 160 may be activated in response to a problematic event within network 110. For example, controller 150 may identify one or more interest points (i.e., instances that host workloads impacted by a problematic event) within network 110 and activate, in response to identifying the interest points, cloud triage endpoints 160 associated with the identified interest points. In the illustrated embodiment of FIG. 1, cloud triage endpoints include cloud triage endpoint 160*a* located in cloud region 120*a*3 of cloud 120*a*, cloud triage endpoint 160*b* located in cloud region 120*b*1 of cloud 120*b*, cloud triage endpoint 160*c* located in cloud region 120*b*3 of cloud 120*b*, and cloud triage endpoint 160*d* located in on-premise data center 130.

In certain embodiments, the path between two interest points may be the underlying cloud provider native networks or the virtual appliance-based network built on top of the cloud native networks. The activation of cloud triage endpoints 160 may be triggered by a network problematic event that occurred between the interest points and requires corrective action. The problematic event may be an introduction of latency, jitter, or packet drop in a current active path between the interest points that is causing the services and/or workloads on the interest points to work at sub-optimal level. In certain embodiments, once activated, cloud triage endpoints 160 trigger the generation of triage data packets 162 within network 110. Triage data packets 162 are packets used to monitor and collect data about network 110. For example, triage data packets 162 may collect cloud triage telemetry data 190 from one or more nodes along cloud triage paths 180. In the illustrated embodiment of FIG. 1, triage data packets 162 carry OAM information. OAM are the processes, activities, tools, and/or standards involved with operating, administering, maintaining, and/or managing system 100. OAM telemetry data may include information such as such as node ID, ingress interface ID, egress interface ID, timestamp, Proof of Transit, sequence numbers, application metadata, generic customer data, and the like. The bidirectional nature of the triage signal may prove useful to triage if asymmetry in cloud triage paths 180 exist between the interest points. Cloud triage endpoints 160 stream cloud triage telemetry data 190 (see notations 190*a* and 190*b* of FIG. 1) collected by triage data packets 162 back to controller 150.

Triage data packets 162 generated by the cloud triage endpoints 160 may include Type-Length-Values (TLV) options to capture cloud triage telemetry data 190. Triage information may include granular details such as the identifications of cloud regions, the identifications of availability zones, the locations of cloud edges, the types of paths traversed by triage data packets 162, latency, jitter (e.g., jitter introduced by the packet exchanges or the traversed path), and the like. Controller 150 may use the triage information to determine the problematic path between the two interest points. In certain embodiments, controller 150 uses the triage information to determine the primary path between two interest points, available secondary paths, and "best" paths.

Cloud triage agents 170 are applications that collect data from one or more network components of network 110. Cloud triage agents 170 may be integrated as IaaS on one or more clouds 120. In the illustrated embodiment of FIG. 1, cloud triage agent 170*a*l is located in cloud region 120*a***l* of cloud 120*a*, cloud triage agent 170*a*2 is located in cloud region 120*a*2 of cloud 120*a*, cloud triage agent 170*a*3 is located in cloud region 120*a*3 of cloud 120*a*, cloud triage agent 170*a*4 is located in cloud region 120*b*1 of cloud 120*b*, cloud triage agent 170*a*5 is located in cloud region 120*b*2 of cloud 120*b*, and cloud triage agent 170*a*6 is located in cloud region 120*b*3 of cloud 120*b*.

Cloud triage agents 170 may include one or more edge cloud triage agents 170b located at a cloud edge. Edge cloud triage agents 170b may be used to determine the entry and exit points of the respective cloud network from/to public Internet 112 or other leased line paths like AWS DX or Azure ER. The identifications of the entry and exits points of each cloud 120 may provide controller 150 with more in-depth information of cloud triage paths 180, which may assist controller 150 in making decision to recover from faulty network paths. In the illustrated embodiment of FIG. 1, edge cloud triage agent 170b1 is located at the edge of cloud region 120a2 of cloud 120a, edge cloud triage agent 170b2 is located at the edge of cloud region 120a3 of cloud 120a, edge cloud triage agent 170b3 is located at the edge cloud region 120b1 of cloud 120b, and edge cloud triage agent 170b4 is located at the edge of cloud region 120b3 of cloud 120b.

In certain embodiments, cloud triage agents 170 are inserted onto cloud packet exchanges that switch and route the cloud workload traffic. A cloud packet exchange may be a native packet router or a virtual appliance-based packet switching/routing node. In some embodiments, cloud triage agents 170 intercept cloud triage packets 162 and perform packet modification to insert the required custom triage data to a level of identifying the actual forwarding problem that is impacting the workloads on the interest points. Triage agent packet replication may be used to discover all the available paths for an end-to-end path triage between the interest points, which may provide a complete representation of the network paths between the interest points.

In certain embodiments, cloud triage agents 170 stream triage telemetry data 190 (see notations 190a and 190b) back to controller 150. Controller 150 may use cloud triage telemetry data 190 received from one or more cloud triage agents 170 to determine one or more actions to resolve the network problem and/or improve the user experience. In some embodiments, cloud triage agents 170 stream cloud triage telemetry data 190 for the signal packet drop with such granular details to allow controller 150 to isolate the cause of excessive latency, jitter, packet drop, etc. In addition to packet drop telemetry, cloud triage agents 170 may stream cloud triage telemetry data 190 of a particular triage signal to controller 150 to build the path even before the triage signal reaches the interest points where cloud triage endpoints 160 are running. With this approach, error correction in triaging may be achieved in controller 150 by co-relating cloud triage telemetry data 190 received from cloud triage agents 170 and cloud triage telemetry data 190 received from cloud triage endpoints 160.

In operation, controller 150 identifies a problematic event between a first interest point and a second interest point of network 110. The first interest point may be associated with a first public cloud (e.g., Azure) and the second interest point may be associated with a second public cloud (e.g., AWS). Controller 150 activates, in response to identifying the problematic event between the first interest point and the second interest point, cloud triage endpoints 160 and/or cloud triage agents 170 associated with the first interest point and a second endpoint associated with the second interest point. Cloud triage endpoints 160 initiate triage data packets 162 along the available paths from the first interest point to the second interest point. Triage data packets 162 collect cloud triage telemetry data 190 that may include cloud region identifications, availability zone indications, cloud edge locations, path type identifications, latency, jitter, packet drop, etc. Controller 150 receives (see notations 190a and 190b), from activated cloud triage endpoints 160 and/or cloud triage agents 170, cloud triage telemetry data 190 associated with a problematic path between the first interest point and the second interest point. Controller 150 determines the problematic path between the first interest point and the second interest point using the telemetry data received from activated cloud triage endpoints 160. and/or cloud triage agents 170. As such, controller 150 may provide visibility and problem information to a user by analyzing cloud triage telemetry data 190 received from cloud triage endpoints 160 and/or cloud triage agents 170. The computation result may be viewed by administrators to take corrective actions, or the results may be fed to autocorrection components operable to reprogram/reroute workload data flows to achieve optimum performance and better user experience.

Although FIG. 1 illustrates a particular number of networks 110, clouds 120, on-premise data centers 130, transit gateways 140, controllers 150, cloud triage endpoints 160, triage data packets 162, and cloud triage agents 170, this disclosure contemplates any suitable number of networks 110, clouds 120, on-premise data centers 130, transit gateways 140, controllers 150, cloud triage endpoints 160, triage data packets 162, and cloud triage agents 170. For example, system 100 may include more or less than two clouds 120, more than one on-premise data center 130, more or less than two transit gateways 140, and/or more than one controller 150.

Although FIG. 1 illustrates a particular arrangement of network 110, clouds 120, on-premise data center 130, transit gateways 140, controller 150, cloud triage endpoints 160, triage data packets 162, and cloud triage agents 170, this disclosure contemplates any suitable arrangement of network 110, clouds 120, on-premise data center 130, transit gateways 140, controller 150, cloud triage endpoints 160, triage data packets 162, and cloud triage agents 170. Furthermore, although FIG. 1 describes and illustrates particular components, devices, or systems carrying out particular actions, this disclosure contemplates any suitable combination of any suitable components, devices, or systems carrying out any suitable actions. For example, one or more cloud triage endpoints 160 of system 100 may perform one or more troubleshooting actions of system 200.

Figure 2:
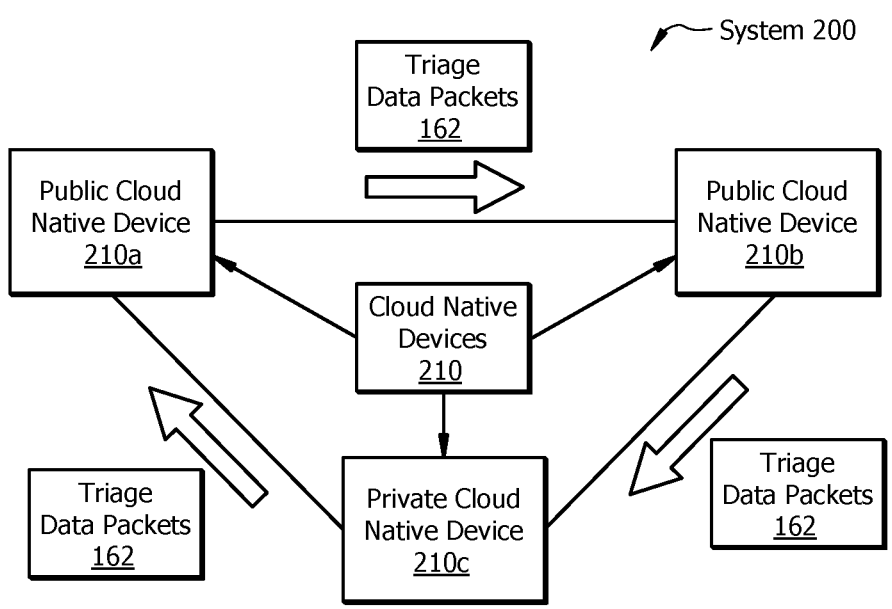
FIG. 2 illustrates another example system for determining problematic paths between interest points in a multi-cloud environment.

FIG. 2 illustrates another example system 200 for determining problematic paths between interest points in a multi-cloud environment. FIG. 2 includes triage data packets 162 (as described above in FIG. 1) and cloud devices 210. Cloud devices 210 include public cloud native device 210a, public cloud native device 210b, and private cloud native device 210c. Public cloud native device 210a and public cloud native device 210b are associated with public clouds. In certain embodiments, public clouds provide services that share computing services among different customers, even though each customer's data and applications running in the cloud may remain hidden from other cloud customers. Private cloud native device 210c is associated with a private cloud. In certain embodiments, private clouds provide services that are not shared with any other organization.

In the illustrated embodiment of FIG. 2, a controller (e.g., controller 150 of FIG. 1) enables the OAM functionality on public cloud native device 210a, public cloud native device 210b, and private cloud native device 210c using the respective application programming interface (API) associated with each cloud native device. Triage data packets 162 are generated from each cloud native device 210 and replicated by receiving cloud native device 210. In the illustrated embodiment of FIG. 2, triage data packets 162 are "out-of-band" OAM packets. "Out-of-band" indicates that the packets are specifically dedicated to OAM and therefore are transferred independent from the original data packets. In certain embodiments, triage data packets 162 of FIG. 2 use OAM packet format 400 described below in FIG. 4. Triage data packets 162 collect and carry telemetry data (e.g., cloud triage telemetry data 190 of FIG. 1) such as cloud region identifications, availability zone indications, cloud edge locations, path type identifications, latency, jitter, packet drop, etc.

Although FIG. 2 illustrates a particular number of cloud devices 210 and triage data packets 162, this disclosure contemplates any suitable number of cloud devices 210 and triage data packets 162. For example, system 200 may include one or more on-premise data center devices. Although FIG. 2 illustrates a particular arrangement of cloud devices 210 and triage data packets 162, this disclosure contemplates any suitable arrangement of cloud devices 210 and cloud triage data packets 162. For example, triage data packets 162 may flow bidirectionally. Furthermore, although FIG. 2 describes and illustrates particular components, devices, or systems carrying out particular actions, this disclosure contemplates any suitable combination of any suitable components, devices, or systems carrying out any suitable actions.

Figure 3:
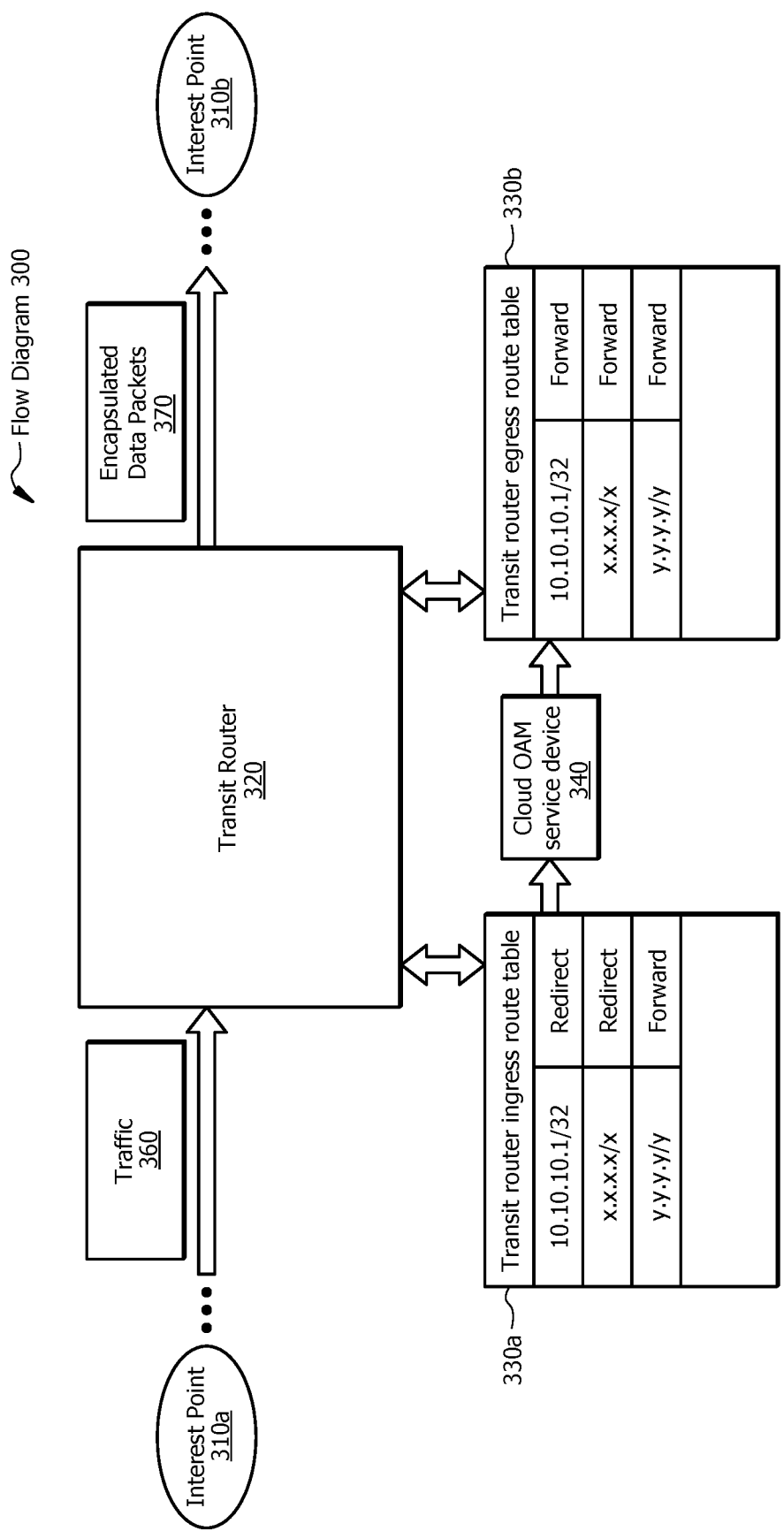
FIG. 3 illustrates an example flow diagram for determining problematic paths between interest points in a multi-cloud environment.

FIG. 3 illustrates an example flow diagram 300 for determining problematic paths between interest points in a multi-cloud environment. In certain embodiments, flow diagram 300 is used in cases of no native implementation of cloud triage OAM. Flow diagram 300 may be used by system 100 of FIG. 1. FIG. 3 includes interest points 310, a transit router 320, transit router route tables 330, and a cloud OAM service device 340.

In flow diagram 300 of FIG. 3, a controller (e.g., controller 150 of FIG. 1) identifies one or more interest points 310 within the network. Interest points 310 are instances within one or more clouds of the network that may host workloads impacted by the problematic event. In the illustrated embodiment of FIG. 3, interest points 310 are selected based in user intent. Interest points 310 may be located completely in one or more public clouds, in one or more private clouds, or a combination thereof. In the illustrated embodiment of FIG. 3, the controller identifies interest point 310a and interest point 310b.

Interest point 310a sends traffic 360 to transit router 320. Transit router 320 is a transit hub used to interconnect one or more cloud networks and/or on-premise data centers. In response to identifying interest points 310, the controller programs transit router 320 to redirect traffic 360 received from interest point 310a to a cloud service agent (e.g., cloud triage agents 170 of FIG. 1) installed on a cloud service device 340. In the illustrated embodiment of FIG. 3, transit router 320 uses transit router route tables 330 to direct traffic 360 to the next destination. Transit router route tables 330 are data tables that include a set of rules for directing incoming network traffic. In certain embodiments, transit router route tables 330 are stored in transit router 320. As illustrated in FIG. 3, if transit router 320 determines that incoming traffic 360 is destined for IP address 10.10.10.1/32 associated with interest point 310b, transit router 320 redirects traffic 360 to cloud OAM service device 340 in accordance with transit router ingress route table 330a.

The service agent installed on cloud OAM service device 340 encapsulates incoming traffic 360 inside a triage data packet (e.g., triage data packet 162 of FIG. 1) and sends encapsulated data packets 370 to transit router 320 in accordance with transit router egress route table 330b. In certain embodiments, encapsulated data packets 370 are in-situ OAM (iOAM) data packets. "In-situ," also known as "in-band," indicates that the operational and telemetry data is carried along with the original data packets rather than being sent within packets specifically dedicated to OAM. In certain embodiments, encapsulated data packets 370 use service packet format 500 described below in FIG. 5. Transit router 320 sends encapsulated data packets 370 to the next hop. The next hop redirects encapsulated data packets 370 to a cloud OAM service device already inserted in the path and programmed to receive encapsulated data packets 370. Encapsulated data packets 370 arrives at the destination node associated with interest point 310b, where the final characteristics of the path (e.g., OAM telemetry data) is communicated to the controller. As such, cloud OAM service devices work in-line with the actual traffic passing through the cloud OAM service devices.

Once the controller determines to track a network traffic flow, the controller sets up the route for the destination node associated with interest point 310b that is being monitored in the different cloud routers (e.g., public or private cloud routers) along the path that have an attached cloud OAM service device. All traffic towards the IP address of the destination node is forwarded to the cloud OAM service device attached to the cloud router. In a public cloud, the cloud router may be in a virtual public cloud (PVC). The first cloud OAM service device creates a copy of each incoming packet. The copy of the incoming packet is an OAM packet that includes an OAM header added by the first cloud OAM service device. The first cloud OAM service device sends the OAM packet in-line with the user traffic flow. The first OAM packet is created when a new flow goes through the cloud OAM service device and is sent ahead of the original packet to the downstream device.

Subsequent OAM packets may be created at a sampled rate. OAM packets sent to the downstream device are forwarded towards other cloud OAM service devices attached to different cloud router hops along the path. The second OAM device sees the OAM packet as the first packet of a new flow and adds its details to the OAM packet instead of creating a new OAM packet. The cloud OAM service device allows the original traffic to flow through and adds its header to the OAM packets which are traversing inline. The final hop cloud OAM service device is determined by performing a lookup of the next hop in the attached router. The next hop may be a Border Gateway Protocol (BGP) session, a transit gateway (TGW) peering, an attached VPC in the cloud, a connected interface on a private cloud router, and the like. The cloud OAM service device in the last hop consumes the OAM packet and generates the OAM results, while allowing the original traffic to flow through as-is.

In certain embodiments, the cloud OAM service device may perform a source lookup in the attached router to determine whether the traffic is coming from an attached network or upstream. The cloud OAM service device may decide whether to generate a new OAM packet or wait to receive an OAM packet from an upstream device to append the incoming OAM packet. In certain embodiments, each cloud OAM service device records the OAM flow data and communicates the OAM flow data to the controller, Accordingly, the controller may identify problematic paths even if one or more OAM packets do not arrive at the final OAM hop.

Figure 4:
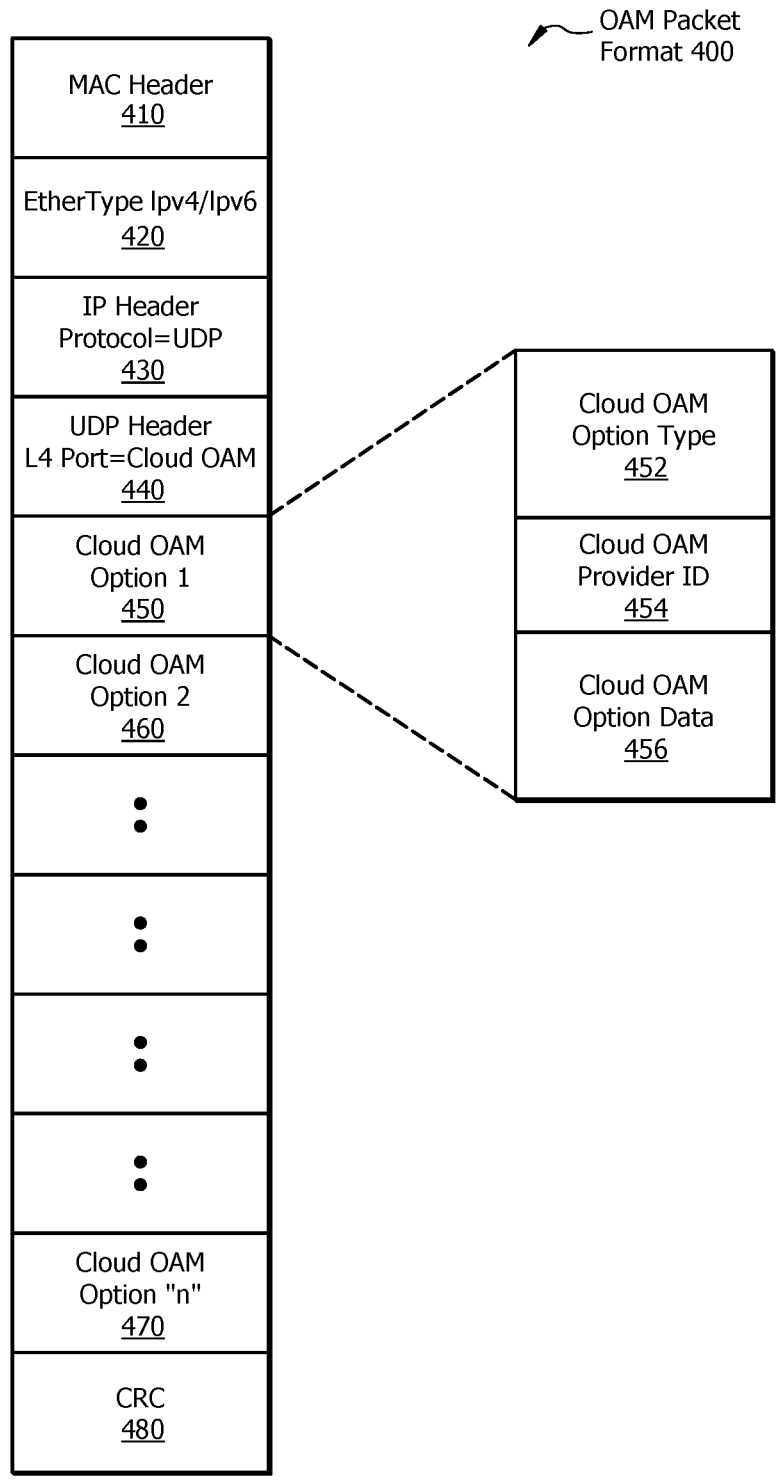
FIG. 4 illustrates an example OAM packet format.

FIG. 4 illustrates an example OAM packet format 400 that may be used by the systems and diagrams of FIGS. 1 and 2. OAM packet format 400 includes options to capture cloud native construct details for visibility, path tracing, and the like. In the illustrated embodiment of FIG. 4, OAM packet format 400 includes a Media Access Control (MAC) header 410, an EtherType 420, an IP header 430, a UDP header 440, a first cloud OAM option 450, a second cloud OAM option 460, an "n" cloud OAM option 470 (where "n" represents any suitable number), and a Cyclic Redundancy Check (CRC) 480.

MAC header 410 includes the data fields added at the beginning of OAM packet format 400 to turn OAM packet format 400 into a frame that can be transmitted. EtherType 420 is a two-octet field in an Ethernet frame that indicates which protocol (e.g., Internet Protocol version 4 (IPv4), IPv6, etc.) is encapsulated in the payload of the frame. EtherType 420 may be used at the receiving end by the data link layer to determine how the payload of OAM packet format 400 is processed. IP header 430 is a field (e.g., an 8-bit number) that defines which protocol (e.g., Transmission Control Protocol (TCP), User Datagram Protocol (UDP), etc.) is used inside the IP packet. In the illustrated embodiment of FIG. 4, IP header 430 indicates that the UDP protocol is being used. In certain embodiments, UDP header 440 is 8-byte fixed and simple header. In the illustrated embodiment of FIG. 4, the UDP header port number LA represents cloud OAM.

First cloud OAM option 450 includes OAM data. First cloud OAM option 450 includes cloud OAM option type 552, cloud OAM provider ID 554, and cloud OAM option data 556. Cloud OAM option type 552 indicates the type of cloud computing service (e.g., private cloud, public cloud, hybrid cloud, multi-cloud, etc.). Cloud OAM provider ID 554 indicates the identity of the cloud provider (e.g., Microsoft Azure, AWS, etc.). Cloud OAM option data 556 captures the cloud construct details for visibility, path tracing, and the like. In certain embodiments, cloud OAM option data 556 captures cloud construct details in private clouds connected to public clouds in hybrid deployment models. Cloud OAM option data 556 may include a Location field, Device ID field, an Attachment ID field, a Route Table ID field, a Timestamp field, and the like.

The Location field encapsulates the cloud region (e.g. cloud regions 120 f FIG. 1) where the gateway/OAM service agent node resides in the public cloud. This field can also encapsulate the location of the gateways/OAM service nodes in private clouds for hybrid cloud deployments. The Device ID field of cloud OAM option data 556 encapsulates the identity of the public cloud gateway/OAM service agent node. This field may also encapsulate the identity of the gateways/OAM service nodes in private clouds for hybrid cloud deployments. The Attachment ID field of cloud OAM option data 556 encapsulates the interface ID of the private cloud or cloud native routers and paths.

The Route Table ID field of cloud OAM option data 556 encapsulates the route table details of the public cloud native routers or private cloud routers where the OAM path is traversed. The Timestamp field of cloud OAM option data 556 timestamps when the cloud OAM packet reached and left the public cloud native routers/OAM service nodes as well as private cloud routers and other cloud OAM capable devices. Second cloud OAM option 460 and "n" cloud OAM option 470 may collect additional telemetry data such as cloud region identifications, availability zone indications, cloud edge locations, path type identifications, latency, jitter, packet drop, etc. CRC 480 is an error-detecting code. CRC 480 may include a 4 Byte field that includes a 32-bits hash code of data that is generated over the Destination Address, Source Address, Length, and Data field. If the checksum computed by destination is not the same as sent checksum value, data received is corrupted.

Figure 5:
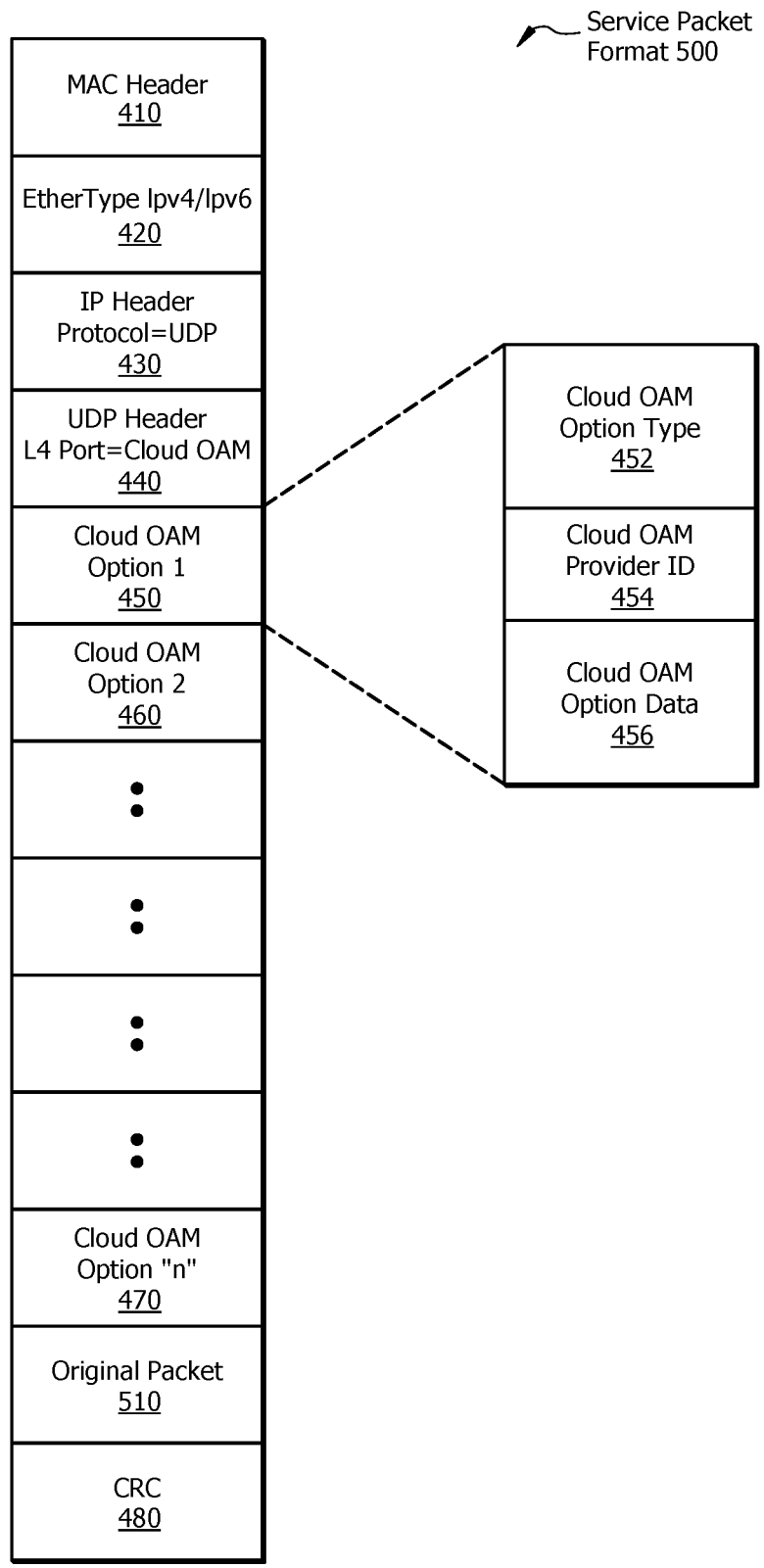
FIG. 5 illustrates an example service packet format.

FIG. 5 illustrates an example service packet format 500 that may be used by the systems and diagrams of FIGS. 1 and 3. Service packet format 500 is used for iOAM data packets such that the operational and telemetry data is carried along with the original data packets rather than being sent within packets specifically dedicated to OAM. Accordingly, service packet format 500 is identical to OAM packet format 400 of FIG. 3 with the exception of an original packet 510.

Figure 6:
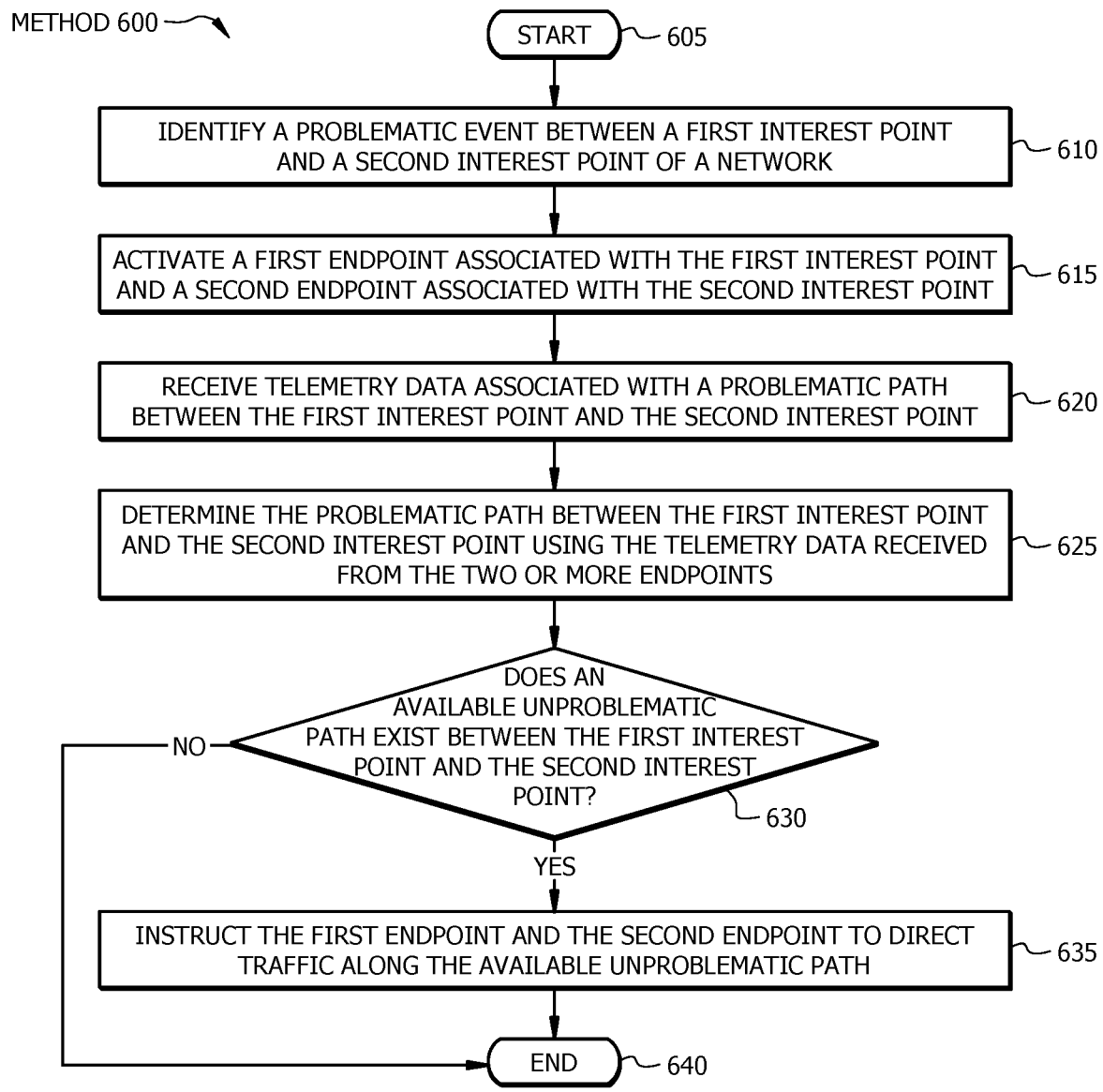
FIG. 6 illustrates an example method for determining problematic paths between interest points in a multi-cloud environment.

FIG. 6 illustrates an example method 600 for determining problematic paths between interest points in a multi-cloud environment. Method 600 begins at step 605. At step 610, a controller (e.g., controller 150 of FIG. 1) identifies a problematic event between a first interest point and a second interest point of a network (e.g., network 110 of FIG. 1). The problematic event may be, for example, an introduction of latency, jitter, and/or packet drop in the current active path between the first and second interest points that is causing the services and/or workloads on the first and second interest points to work at a sub-optimal level. The first interest point may be associated with a first cloud (e.g., cloud 120a of FIG. 1), and the second interest point may be associated with a second cloud (e.g., cloud 120b of FIG. 1). For example, the first interest point may be located within Azure's cloud computing platform, and the second interest point may be located within AWS's cloud computing platform. Method 600 then moves from step 610 to step 615.

At step 615 of method 600, the controller activates a first endpoint (e.g., cloud triage endpoint 160a of FIG. 1) associated with the first interest point and a second endpoint (e.g., cloud triage endpoint 160b of FIG. 1) associated with the second interest point. In certain embodiments, the controller activates the first and second endpoints in response to identifying the problematic event between the first and second interest points. The first and/or second endpoints initiate OAM data packets (e.g., triage data packets 162 of FIG. 2) along the available paths from the first interest point to the second interest point. Method 600 then moves from step 615 to step 620.

At step 620 of method 600, the controller receives, from the first and/or second endpoints, telemetry data (e.g., cloud triage telemetry data 190 of FIG. 1) collected by the OAM data packets. The telemetry data collected by the OAM packets includes information such as cloud region identifications, availability zone indications, cloud edge locations, path type identifications, latency, jitter, packet drop, etc. Method 600 then moves from step 620 to step 625, where the controller determines the problematic path between the first interest point and the second interest point using the telemetry data received from activated first and/or second endpoints. The problematic path is the path causing the problematic event. The controller may build the problematic path by determining each node along the path. Method 600 then moves from step 625 to step 630.

At step 630 of method 600, the controller determines whether one or more available unproblematic paths exist between the first interest point and the second interest point. For example, the controller may use the telemetry data received from the first and/or second endpoints to determine one or more available alternative paths between the first and second interest points. If the controller determines that an available unproblematic path exists between the first interest point and the second interest point, method 600 moves from step 630 to step 635, where the controller instructs the first endpoint and/or the second endpoint to direct traffic along the available unproblematic path. Method 600 then moves from step 635 to step 640, where method 600 ends. If, at step 630, the controller determines that an available unproblematic path does not exist between the first interest point and the second interest point, method 600 advances from step 630 to step 640, where method 600 ends.

Although this disclosure describes and illustrates particular steps of the method of FIG. 6 as occurring in a particular order, this disclosure contemplates any suitable steps of the method of FIG. 6 occurring in any suitable order. Although this disclosure describes and illustrates an example method for determining problematic paths between interest points in a multi-cloud environment including the particular steps of the method of FIG. 6, this disclosure contemplates any suitable method for determining problematic paths between interest points in a multi-cloud environment including any suitable steps, which may include all, some, or none of the steps of the method of FIG. 6, where appropriate. For example, method 600 may include a step where the controller integrates triage agents at one or more locations (e.g., within a private cloud, a public cloud, an on-premise data center, etc.) within the network. As another example, method 600 may include a step where the controller instructs a transit router to redirect an identified traffic flow to a cloud service agent.

Although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6. For example, one or more nodes of the network (e.g., a cloud triage endpoint, a cloud OAM service device, etc.) may perform one or more steps of method 600.

Figure 7:
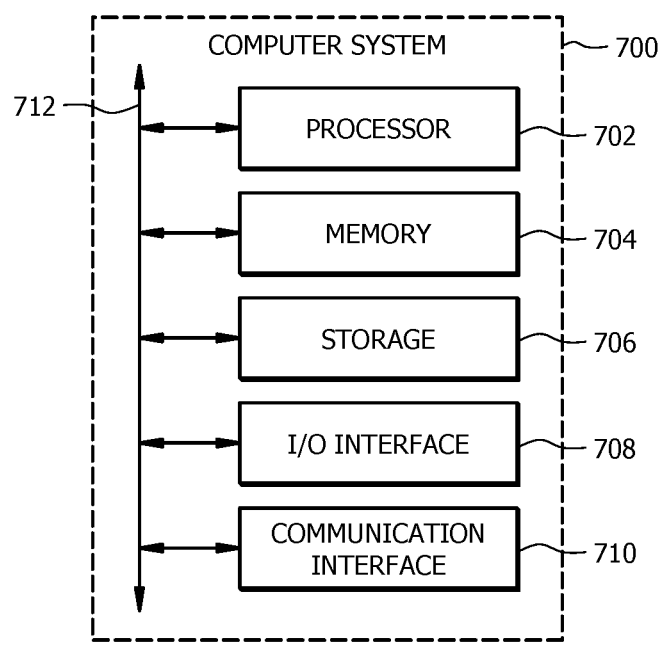
FIG. 7 illustrates an example computer system that may be used by the systems and methods described herein.

FIG. 7 illustrates an example computer system 700. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700. Herein, reference to a computer system may encompass a computing device, and vice versa, where appropriate. Moreover, reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a LAN, a WAN, a MAN, or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a 3G network, a 4G network, a 5G network, an LTE network, or other suitable wireless network or a combination of two or more of these. Computer system 700 may include any suitable communication interface 710 for any of these networks, where appropriate. Communication interface 710 may include one or more communication interfaces 410, where appropriate. Although this disclosure describes and illustrates a particular communication interface, this disclosure contemplates any suitable communication interface.

In particular embodiments, bus 712 includes hardware, software, or both coupling components of computer system 700 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A network component, comprising:
   one or more processors; and
   one or more computer-readable non-transitory storage media coupled to the one or more processors and comprising instructions that, when executed by the one or more processors, cause the network component to perform operations comprising:
     identifying a problematic event between a first interest point and a second interest point of a network;
     activating a first endpoint associated with the first interest point and a second endpoint associated with the second interest point, wherein:
       activating the first endpoint and the second endpoint initiates a generation of Operations, Administration, and Maintenance (OAM) out-of- band data packets by the first endpoint and the second endpoint; and
       each of the OAM out-of-band data packets uses an OAM packet format, the OAM packet format comprising:
         a Media Access Control (MAC) header;
         an EtherType;
         an Internet Protocol (IP) header;
         a User Datagram Protocol (UDP) header;
         at least one cloud OAM option; and
         a Cyclic Redundancy Check (CRC);
     receiving, from the first endpoint and the second endpoint, telemetry data associated with a problematic path between the first interest point and the second interest point; and
     determining the problematic path between the first interest point and the second interest point using the telemetry data received from the first endpoint and the second endpoint, wherein the telemetry data is collected by the OAM out-of-band data packets.

2. The network component of claim 1, wherein the telemetry data comprises an identity of one or more cloud providers.

3. The network component of claim 1, wherein each of the first interest point and the second interest point are associated with one of the following:
   a public cloud;
   a private cloud; or
   an on-premise data center.

4. The network component of claim 1, wherein the problematic event is associated with at least one of the following network characteristics:
   latency;
   jitter; or
   packet drop.

5. The network component of claim 1, wherein the at least one cloud OAM option comprises a cloud OAM option type, a cloud OAM provider ID, and cloud OAM option data.

6. The network component of claim 1, the operations further comprising:
   activating one or more cloud agents within the network;
   receiving, from the one or more cloud agents, additional telemetry data associated with the problematic path between the first interest point and the second interest point; and
   computing the problematic path between the first interest point and the second interest point using the additional telemetry data received from the one or more cloud agents.

7. The network component of claim 1, the operations further comprising instructing one or more transit routers within the network to redirect an identified traffic flow to a cloud agent.

8. A method, comprising:
   identifying a problematic event between a first interest point and a second interest point of a network;
   activating a first endpoint associated with the first interest point and a second endpoint associated with the second interest point, wherein:
     activating the first endpoint and the second endpoint initiates a generation of Operations, Administration, and Maintenance (OAM) out-of-band data packets by the first endpoint and the second endpoint; and
     each of the OAM out-of-band data packets uses an OAM packet format, the OAM packet format comprising:
       a Media Access Control (MAC) header;
       an EtherType;
       an Internet Protocol (IP) header;
       a User Datagram Protocol (UDP) header;
       at least one cloud OAM option; and
       a Cyclic Redundancy Check (CRC);
   receiving, from the first endpoint and the second endpoint, telemetry data associated with a problematic path between the first interest point and the second interest point; and
   determining the problematic path between the first interest point and the second interest point using the telemetry data received from the first endpoint and the second endpoint, wherein the telemetry data is collected by the OAM out-of-band data packets.

9. The method of claim 8, wherein the telemetry data comprises an identity of one or more cloud providers.

10. The method of claim 8, wherein each of the first interest point and the second interest point are associated with one of the following:
- a public cloud;
- a private cloud; or
- an on-premise data center.

11. The method of claim 8, wherein the problematic event is associated with at least one of the following network characteristics:
- latency;
- jitter; or
- packet drop.

12. The method of claim 8, wherein the at least one cloud OAM option comprises a cloud OAM option type, a cloud OAM provider ID, and cloud OAM option data.

13. The method of claim 8, further comprising:
- activating one or more cloud agents within the network;
- receiving, from the one or more cloud agents, additional telemetry data associated with the problematic path between the first interest point and the second interest point; and
- computing the problematic path between the first interest point and the second interest point using the additional telemetry data received from the one or more cloud agents.

14. The method of claim 8, further comprising instructing one or more transit routers within the network to redirect an identified traffic flow to a cloud agent.

15. One or more computer-readable non-transitory storage media embodying instructions that, when executed by a processor, cause the processor to perform operations comprising:
- identifying a problematic event between a first interest point and a second interest point of a network;
- activating a first endpoint associated with the first interest point and a second endpoint associated with the second interest point, wherein:
  - activating the first endpoint and the second endpoint initiates a generation of Operations, Administration, and Maintenance (OAM) out-of-band data packets by the first endpoint and the second endpoint; and
  - each of the OAM out-of-band data packets uses an OAM packet format, the OAM packet format comprising:
    - a Media Access Control (MAC) header;
    - an EtherType;
    - an Internet Protocol (IP) header;
    - a User Datagram Protocol (UDP) header;
    - at least one cloud OAM option; and
    - a Cyclic Redundancy Check (CRC);
- receiving, from the first endpoint and the second endpoint, telemetry data associated with a problematic path between the first interest point and the second interest point; and
- determining the problematic path between the first interest point and the second interest point using the telemetry data received from the first endpoint and the second endpoint, wherein the telemetry data is collected by the OAM out-of-band data packets.

16. The or more computer-readable non-transitory storage media of claim 15, wherein the telemetry data comprises an identity of one or more cloud providers.

17. The or more computer-readable non-transitory storage media of claim 15, wherein each of the first interest point and the second interest point are associated with one of the following:
- a public cloud;
- a private cloud; or
- an on-premise data center.

18. The or more computer-readable non-transitory storage media of claim 15, wherein the problematic event is associated with at least one of the following network characteristics:
- latency;
- jitter; or
- packet drop.

19. The or more computer-readable non-transitory storage media of claim 15, wherein the at least one cloud OAM option comprises a cloud OAM option type, a cloud OAM provider ID, and cloud OAM option data.

20. The or more computer-readable non-transitory storage media of claim 15, the operations further comprising:
- activating one or more cloud agents within the network;
- receiving, from the one or more cloud agents, additional telemetry data associated with the problematic path between the first interest point and the second interest point; and
- computing the problematic path between the first interest point and the second interest point using the additional telemetry data received from the one or more cloud agents.

* * * * *